Patented Dec. 19, 1933

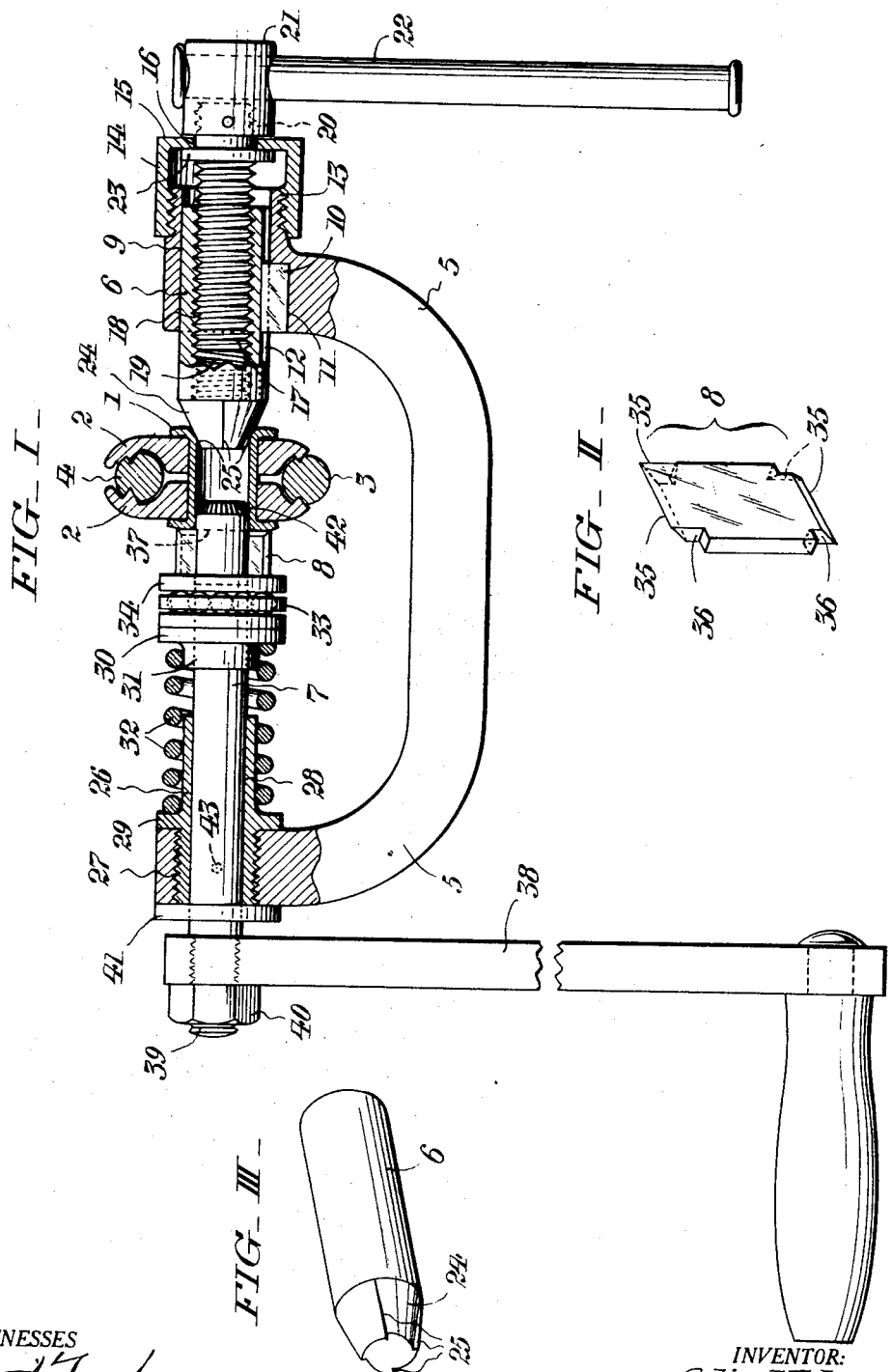

1,940,420

UNITED STATES PATENT OFFICE 1,940,420

TOOL FOR CUTTING RIVETS OR THE LIKE

Adin U. Kerns, Altoona, Pa.

Application September 10, 1931
Serial No. 562,053

1 Claim. (Cl. 77—2)

My invention relates to tools for cutting rivets or the like, and more particularly to hand tools which are especially adapted for cutting the heads of hollow rivets of ductile metal, such as used for holding together trolley wire clamp members on overhead electric supply lines.

One object of the invention is to provide a comparatively light and compact tool which may be carried with ease to the work to which it is to be applied, and which is capable of being operated by a single person.

A more specific object of the invention is to provide in such a portable tool, means for engaging one side of the work to hold the same against rotation, means for imparting rotary movement to a cutter at the other side of the work, and additional means, preferably in the form of a spring, for maintaining the cutter in pressure engagement with the work while the cutter is rotating.

A further object of the invention is to provide means for preventing chattering of the cutter while it is rotating, and this object is preferably accomplished by forming the end of the cutter shaft with a bevelled milling cutter so that it is self seating within the hollow of the rivet adjacent to the head to be cut.

Other objects and advantages characterizing the present invention will become more fully apparent from the description hereinafter of one embodiment or example thereof, the description having reference to the accompanying drawing, whereof:

Fig. I represents a side view, partly in section, of a tool for cutting rivets as applied to trolley wire clamps held together by a hollow rivet.

Fig. II represents a perspective view of a flat cutter used therein; and

Fig. III represents a perspective view of clamping die used therein.

In the drawing, there is shown at 1 a hollow rivet holding together opposed clamp members 2 between which are gripped a pair of conductors 3 and 4, the lower conductor 3 comprising the contact wire of an overhead electric railway supply line, and the upper conductor 4 comprising the feed wire, which is commonly associated with the contact wire in such systems. It will be understood, however, that the tool hereinafter described is capable of a variety of uses other than for cutting rivets on trolley wire clamp members, and that such parts are merely referred to herein as representative of the type of work to which the tool may be applied.

The cutting tool comprises generally a yoke frame or stationary element 5 straddling the work, a clamping die 6, which is adapted to engage one side of the work to hold the same against rotation, and a shaft 7 carrying a cutter 8 which is adapted to engage the other side of the work. The central portion of the yoke frame 5 affords a convenient part to be gripped by the hand while the operator positions the tool for operation and while the cutting operation is being performed. When used for cutting rivets on trolley wire clamp members, the tool can be handily carried to the point of application and there mounted in the position shown in the drawing, in which the yoke frame hangs downward from the overhead wires.

One end of the frame 5 is provided with a cylindrical opening 9 which accommodates the clamping die 6. A key 10, engaging in a slot 11 on the frame 5 and in a keyway 12 on the clamping die 6, prevents the clamping die from rotating, while permitting it to slide through the frame in the direction of its length. Secured to threads 13 on the extreme end of the frame 5 there is a correspondingly threaded screw holder 14 having a flat face 15 with a circular opening 16 therein. Within the circular opening 16 of the screw holder 14 there is inserted a screw 17, the inner threaded end 18 of which engages corresponding internal threads 19 within the clamping die 6. The screw 17 is also provided with an outer threaded end 20 to which is secured a block 21 carrying a sliding handle 22. The engagement of the screw holder 14 between the block 21 on the one side and a collar 23 of the screw 17 on the other side serves to restrain the screw against longitudinal movement. Accordingly, by turning the handle 22, the clamping die 6 may be screwed toward or away from the work in an obvious manner.

As shown in Fig. III the clamping die 6 is formed with a tapered end 24 having teeth 25 which bite into the end of the rivet 1 to hold the same against rotation, and to prevent the yoke frame 5 from turning bodily about the work.

The other end of the frame 5 is provided with a sleeve 26 having a threaded end 27 fitted into the frame and held against rotation by a pin 43, and having a cylindrical bore 28 within which the cutter shaft 7 fits snugly with capacity for rotating and sliding movement. Between the collar 29 of the sleeve 26 and the collar 30 of an additional movable sleeve 31 a helical spring 32 is mounted. The latter sleeve 31 bears upon a ball bearing 33 which in turn bears upon a disk 34 abutting against the cutter 8.

The cutter 8, as shown in Fig. II, is preferably a flat boring cutter having sharp edges 35 adapted to engage the head of the rivet 1. The base of the cutter is notched at 36 so that it may be seated within the disk 34 with its body passing through a rectangular slot 37 in the end of the cutter shaft 7. In an obvious manner the spring 32 tends to force the cutter 8, as well as the cutter shaft 7, towards the work. Sliding movement of the shaft 7, however, is limited by the handle 38 which is secured to the threaded end 39 of the shaft by a nut 40 with a washer 41 interposed between the handle 38 and the yoke frame 5.

By turning the handle 38, the shaft 7 and its cutter 8 are rotated, and at the same time the cutter shaft 7, which is slidably mounted in the sleeve 26, is forced towards the work by means of the spring 32, which is normally under compression, so that the cutter is maintained in pressure engagement with the work. The pressure exerted upon the work through the spring 32 may be increased by advancing the clamping die 6 by rotation of the handle 22.

The inner end of the cutter shaft 7 is formed at 42 with a bevelled milling cutter, and this end is accommodated within the hollow of the rivet 1 near the head to be cut. Thus if the inside diameter of the rivet is not uniform, due to distortion of the metal in the forming of the rivet, the shaft 7 will nevertheless seat itself in the end of the rivet, and its bevelled end will assist the cutter 8 in severing the rivet head. Furthermore, the seating of the end of the shaft 7 in the rivet 1 serves to center the cutter with respect to the rivet head, and thus to prevent chattering of the cutter while the tool is operating.

The operation of the above described cutting tool, which I conveniently term a "hand tool", to distinguish it from a non-portable machine, is as follows: Assuming that the tool is to be applied to the cutting of rivet heads of trolley wire clamp members on an overhead line structure, the operator carries the tool to the point of application and mounts the tool on the work. The mounting of the tool on the work involves, first, the separation of the clamping die 6 from the end of the cutter shaft 7 to permit the tool to straddle the clamp members; then the drawing in of the clamping die, by means of the handle 22, to a point where it engages the hollow of the rivet head 1 at one side of the work; and then the further drawing in of the clamping die until it forces the cutter shaft 7 at the opposite side of the work outward beyond the frame 5 against the pressure of the spring 32. When the clamping die is in biting engagement with one end of the rivet 1, and when the spring 32 has been further compressed so that the handle 38 on the cutter shaft 7 is clear of the washer 41, the tool is in readiness for the cutting operation. Thereafter the handle 38 is rotated causing the cutter 8, influenced by the pressure of the spring 32, to cut the head of the rivet 1. Incident to this operation, the bevelled milling cutter 42 seats itself within the hollow of the rivet, and centers the cutter 8 with respect to the head of the rivet, thus assisting in the cutting off of the head, as well as preventing the cutter from chattering.

It will be observed that the tool can be conveniently operated by a single person, the seating of the tool upon the work being accomplished by turning the handle 22 with the right hand while the left hand grasps the yoke frame 5; and the subsequent rotation of the cutter shaft 7 being accomplished by turning the handle 38 with the left hand while the right hand grasps the yoke frame 5.

While I have shown and described a tool in which the rotation of the cutter shaft is effected manually by turning a handle 38, it will be apparent that a variety of other means may be employed for rotating the cutter shaft, and that the use of a handle represents merely one example of a convenient means for actuating the cutter shaft. It will also be apparent that various changes may be made in the form of the apparatus described without departing from the spirit of my invention as defined in the claim hereto annexed. Furthermore, the tool of this invention may be applied to a variety of other types of work, though it is especially adapted to the cutting of hollow rivets.

Having thus described my invention, I claim:

A tool for cutting rivets comprising a yoke frame, a clamping die mounted at one end of said frame and having teeth thereon, a screw for moving said teeth into biting engagement with one end of the rivet, a shaft rotatable and slidable in the other end of said frame and having a cutter thereon adapted to engage the head at the other end of the rivet, a collar mounted freely on said shaft, and separated from said cutter by a ball bearing, a spring disposed between said collar and the end of the yoke frame, said spring tending to slide said shaft through said yoke frame to maintain said cutter in engagement with the head at the other end of the rivet, and means for rotating said cutter shaft, whereby said rivet head may be cut from its body.

ADIN U. KERNS.